SEARCH ROOM

SUBSTITUTE FOR MISSING XR

April 2, 1968 E. D. McCALLA 3,376,382

DIRECT VIEWING IMAGE ENHANCEMENT METHOD AND APPARATUS

Filed Nov. 10, 1964 3 Sheets-Sheet 1

INVENTOR.
EUGENE D. McCALLA
BY George C. Sullivan
Agent

INVENTOR.
EUGENE D. McCALLA
BY George C. Sullivan
Agent

INVENTOR.
EUGENE D. McCALLA
BY George C. Sullivan
Agent

United States Patent Office 3,376,382

Patented Apr. 2, 1968

3,376,382

DIRECT VIEWING IMAGE ENHANCEMENT METHOD AND APPARATUS

Eugene D. McCalla, Smyrna, Ga., assignor to Lockheed Aircraft Corporation, Burbank, Calif.

Filed Nov. 10, 1964, Ser. No. 410,151
13 Claims. (Cl. 178—6.8)

ABSTRACT OF THE DISCLOSURE

A method and apparatus for enhancing images contained on a photographic transparency by scanning the transparency with a spot of light, measuring the amount of light passed through the transparency, and generating a signal to modulate the intensity of the scanning light spot. Scanning is accomplished in certain embodiments with two light spots which simultaneously scan the transparency while one light spot lags the other in the scan pattern by a period of time equal to the time delay present in the signal processing circuitry used with the apparatus. Where visual scanning of the transparency is desired, only the second light spot need be visible and the first light spot can be outside the visible light spectrum.

This invention relates in general to image enhancement and in particular to method and apparatus for direct viewing of an enhanced image.

Image enhancement as the term is generally used comprises the treatment of images, obtained either from an actual object or from a photographic reproduction of an object, in such a way that certain of the contents of the image will be enhanced and other of the contents of the image will be attenuated. As the term is used with respect to this invention, however, image enhancement is restricted to the treatment in the above manner of photographic images. A typical application of image enhancement might involve, for example, the examination of a photographic image containing both periodic structure and relatively non-periodic structure. In the enhanced version of this image the periodic structure, by which is meant an object consisting of a plurality of elements of generally similar appearance having approximately uniform spacing in at least one direction in the image, would be enhanced while the relatively non-periodic structure would be attenuated. By means of this image enhancement, the presence of an image of periodic details may be readily made apparent to an observer without the need of resort to painstaking, fatiguing and time-consuming scrutiny of the image.

One proposed technique wherein image enhancement can be accomplished involves the use of a closed circuit video system in which the image to be scanned is viewed by a television camera. The output of the camera, consisting of video signals representing the content of the scanned image, is treated by suitable image enhancement circuitry and the resulting video signal, which may consist of a certain range or ranges of frequencies contained in the original signal, is then passed to a video monitor receiver where the enhanced image is viewed by an operator.

As in any video system, the problem of fidelity of information transmission is vital to the proper operation of the above-described technique. To achieve the desired resolution, video equipment requiring band widths approaching ten megacycles may be used; such equipment frequently is troubled by the presence of jitter and interlace problems resulting from imperfect synchronization of video camera and receiver, and these problems may be complicated by the further fact that the equipment may be used in an environment where the basic power supply source is subject to voltage and frequency fluctuation. Because of the problems attending the use of the closed circuit video system, an improved image enhancement technique preferably would obviate the need for such a system.

According to the present invention, a photographic transparency containing an image to be subjected to enhancement techniques is scanned with a beam from a source of light. The amount of light allowed to pass through the transparency by the varying contrast of the transparency is measured by a suitable photosensitive transducer, the output of which is a signal corresponding to the image contained on the transparency. This signal then is processed by suitable image enhancement circuitry and the resultant signal is fed back so as to modulate the intensity of the source of light. Intensity modulation of the light as it scans the transparency will cause certain portions of the transparency to receive greater illumination than other portions whereby the images contained on the certain portions of the transparency will be more brightly illuminated or enhanced with respect to the other portions. The enhanced transparency can be viewed by an operator either directly or through the medium of a ground glass screen. Suitable provisions are made to compensate for the fact that the image enhancement circuitry introduces into the processed signal a period of time delay which is long relative to the time taken for light to travel from the source to the transparency.

Accordingly, an object of this invention is to provide improved method and apparatus for enhancing selected portions of an image.

A further object is to provide improved method and apparatus for enhacing selected portions of an image on a photographic transparency.

Another object is to provide method and apparatus for enhancing selected portions of an image wherein the enhanced portions may be directly viewed without resort to an intermediate information transmission system.

Still another object is to provide method and apparatus for enhancing selected portions of an image on a photographic transparency wherein the enhanced portions are made to appear as such on the transparency.

Yet another object is to provide method and apparatus for image enhancement wherein a portion of a photographic transparency containing an image to be enhanced is selectively illuminated.

A still further object is to provide method and apparatus in which a selected portion of an image on a photographic transparency is enhanced and in which compensation is made for the time delay inherent in image enhancement circuitry.

The exact nature of this invention as well as other objects and advantages thereof will be readily apparent from consideration of the following specification relating to the annexed drawings in which.

Figures 1, 2:
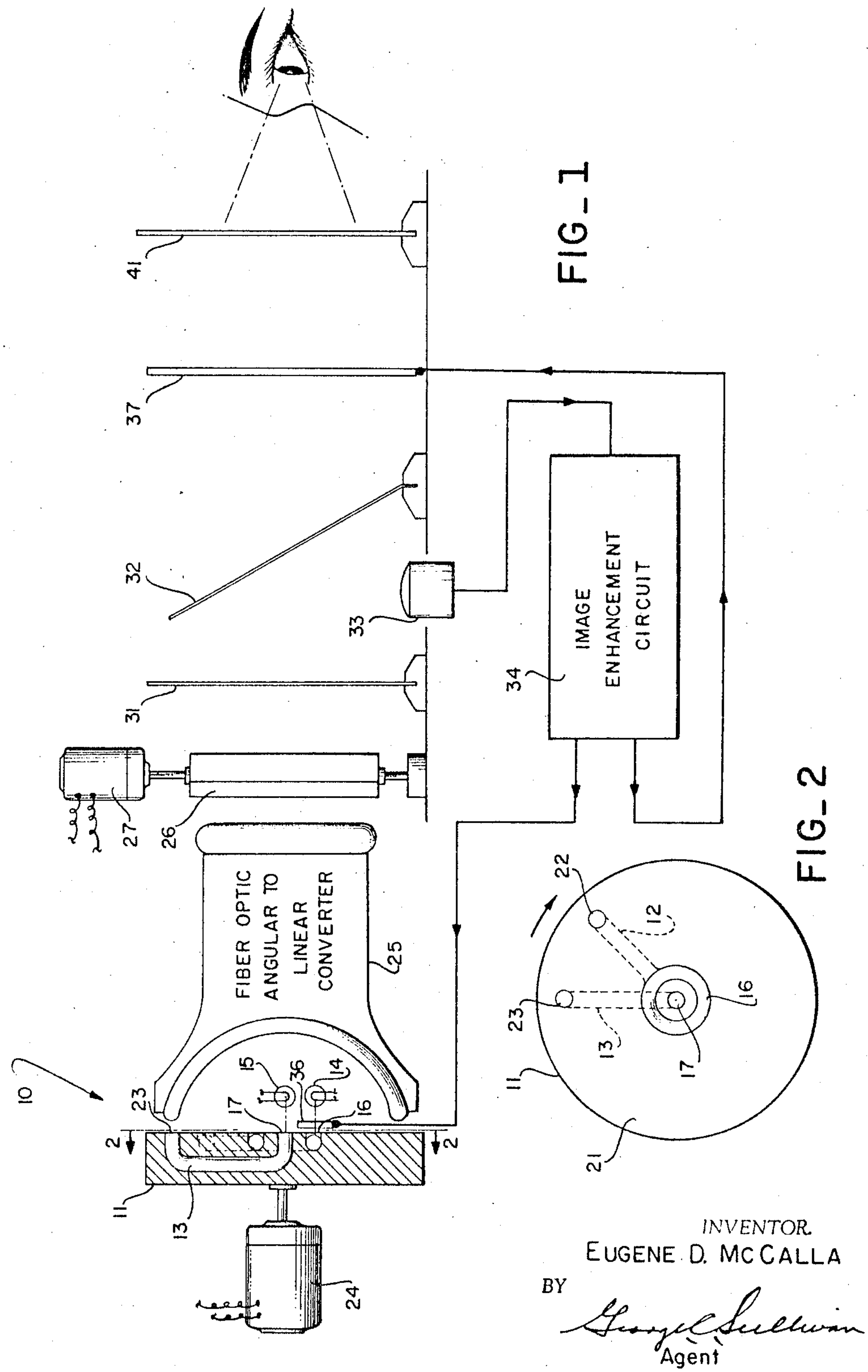
FIGURE 1 shows a schematic view of an embodiment of this invention.
FIGURE 2 shows a section view taken along line 2—2 of the embodiment of FIGURE 1.

This invention generally comprises method and apparatus for scanning a photographic transparency with at least one spot of light. The intensity of illumination transmitted through the transparency, which is a function of the density of the transparency at the point illuminated by the spot, is measured by a suitable photosensitive transducer and is converted thereby into an electrical signal whose frequency and amplitude correspond to the image as scanned on the photographic transparency. This signal is processed by suitable image enhancement circuitry and the processed signal is then used to control the intensity of the spot scanning the transparency. Alternatively, the processed signal may be used to control the intensity of illumination that has passed through the transparency. Inasmuch as image enhancement circuits generally impart to signals processed thereby a time delay which is relatively large compared to the time required or light to travel from the light source of the transparency, there is provided in one embodiment of the invention a second light source causing a second light spot to scan the transparency. The first spot precedes the second spot in the scan pattern by a predetermined time which is made substantially equivalent to the time delay of the image enhancement circuit, and substantially all of the illumination transmitted through the transparency from the first spot is used to provide the input signal to the image enhancement circuit. The output of this circuit modulates the intensity of at least the second spot of light and it is the illumination from this second spot is transmitted by the transparency which is viewed by an operator.

In one embodiment of the invention there is generally provided a fly wheel having a pair of light pipes each of which has its separate light source. The circular scan path produced by this fly wheel is converted by optical apparatus into the desired scan pattern to be applied to the transparency. In this embodiment the intensity of light supplied to one light pipe remains constant while the intensity of light supplied to the other light pipe is modulated by the output of the image enhancement circuit.

In another embodiment illumination is provided by a cathode ray tube to which have been provided appropriate sweep voltages to produce the desired scan pattern. The light output from the cathode ray tube, including a first component of light and a second component of light, is split by suitable optical apparatus into two beams of light. Appropriate filters are then disposed in each of these beams whereby one beam contains light of the first component only and the other beam contains light of the second component only. The intensity of light of the first component transmitted by the transparency provides the input signal to the image enhancement circuit, the output of which functions to modulate the intensity of the cathode ray tube output.

In still another embodiment of this invention the photographic transparency is scanned by light from a flying spot scanner which may be of the cathode ray tube variety. The use of beam splitting techniques as set forth in the immediately preceding embodiment is avoided by the use of a reflective member which diverts substantially all of one light component so that it may be seen by an observer.

Turning now to FIGURES 1 and 2 for a more detailed view of an embodiment of this invention, there is shown scanning apparatus 10 including fly wheel 11 having therein a first fiber optic light pipe 12 and a second fiber optic light 13. These light pipes are contained on the fly wheel such that ends 16 and 17 are located adjacent the axis of rotation of the fly wheel 11. A first light source 14 is disposed adjacent the end 16 of the first light pipe 12 while a second light source 15 is disposed adjacent the end 17 of the second light pipe 13. The end 22 of the first light pipe 12 and the end 23 of the second light pipe 13 are contained on the surface 21 of the fly wheel. Light from the respective light sources 14 and 15 will be conducted by the light pipes to the ends 22 and 23 thereof; rotation of fly wheel 11 by means of motor 24 will thus cause the spots of light produced by ends 22 and 23 to be rotated in a circular path. Although the ends 16 and 17 of light pipes 12 and 13 are schematically shown in FIGURES 1 and 2 as being, respectively, an end 17 having all of the light pipe fibers in a bundle at the center of rotation of fly wheel 11 and an end 16 having the light pipe fibers arranged as an annulus around end 17, it should be understood that any arrangement whereby these ends 16 and 17 are exposed to their respective light sources 14 and 15 throughout complete rotation of the fly wheel will be suitable for the purposes of this embodiment. Light source 15 preferably is a white light, by which is meant a light having more a plurality of the components of the visible spectrum although not necessarily all of the visible spectrum, while light source 14 produces a monochromatic light (for example, either blue or ultraviolet) to which the unaided eye is either relatively insensitive or completely insensitive.

The circular path of light caused by rotation of fly wheel 11 is received by the input of fiber optic angular to linear converter 25. Converter 25 functions to transform the circular light path described by the two light spots into a linear light path described by two corresponding light spots. The displacement of each of the light spots from a reference point on the linear path is a function of the angular displacement from a given reference with respect to the rotating fly wheel 11 of the light pipe producing that spot. One complete revolution of the fly wheel thus produces one complete cycle of linear motion of each of the light spots as seen at the output of converter 25.

The linearly moving light spots produced by converter 25 are received by rotating reflecting apparatus 26 such as a mirror or prism. Apparatus 26, whose axis of rotation is parallel to the plane of the linear output of converter 25, is rotated by motor 27. The light spots are reflected by apparatus 26 in a direction substantially transverse to the plane of the linear output of converter 25.

Receiving light reflected from reflecting apparatus 26 is a photographic transparency 31 containing thereon various images of either a periodic or non-periodic nature which are to be subjected to image enhancement. The term "transparency" as used in the context of this invention includes either a negative or a positive photographic image disposed on a substantially transparent base. Transparencies bearing either black and white or color images may be used.

Positioned on the side of transparency 31 opposite from reflecting apparatus 26 is selective reflecting device 32. This reflecting device, which by way of example may comprise a thin film filter, functions to reflect substantially all of the monochromatic light originating from light source 14, while at the same time passing substantially all of the white light originating from light source 15. Light source 15 is chosen so as to contain little or no light of the type produced by light source 14.

Monochromatic light reflected by reflecting device 32 is received by photosensitive transducer 33. This photosensitive transducer, which may take the form of a conventional photo multiplier tube, produces as an output an electrical signal which is a function of the intensity of light received thereby.

The output signal from photosensitive transducer 33 is received by image enhancement circuit 34. While the specific details of the image enhancement circuit form no part of the instant invention, a brief statement of these details will be given as an aid to the understanding of the operation of the invention. The output of photosensitive transducer 33 consists generally of an AC signal whose amplitude and frequency is dependent upon (1) the type and rate of scan of the transparency and (2) the type of subject matter represented by the images on a particular transparency. Images of a relatively non-periodic nature will, generally speaking, cause to be produced a signal having a rather broad band assortment of frequencies while images of a periodic or repetitive nature will, again generally speaking, cause to be produced a signal whose frequency is a function of, among other things, the spacing of the periodic elements in the image and the velocity at which the image is being scanned. Since it is desired to enhance these periodic images and to attenuate non-periodic images, image enhancement circuit 34 may, by way of example, be designed so as to pass with little or no attenuation the relatively narrow range of frequencies representing a periodic image and to greatly attenuate frequencies falling without this range. An example of an image enhancement circuit would be a band pass filter. More specific information regarding image enhancement circuitry may be had by reference in U.S. patent application Ser. No. 271,330, filed Apr. 8, 1963, copending herewith and assigned to the same assignee, now U.S. Patent No. 3,283,070.

The output of image enhancement circuit 34, which is a signal representing the enhanced image, is then used to vary the effective illumination of the transparency as seen by an observer thereof. Several alternative ways in which this may be done are shown. The output of the image enhancement circuit 34 may be used to modulate the intensity of the first light source 14. An alternative approach, and one that may be desirable where there cannot be conveniently found a light source whose instantaneous intensity can be varied in accordance with the rapid fluctuations of the signal, is the use of a light valve disposed between the first light source 14 and the end 16 of light pipe 12. Examples of such a light valve are a Kerr cell and an image intensifier tube. Yet another alternative is the use of a light valve 37 positioned to receive light transmitted by selective reflecting device 32. Light valve 37 is controlled by the output from image enhancement circuit 34 whereby the operator views the light transmitted by transparency 31 as modulated by the light valve.

The light transmitted through selective reflective means (and through light valve 37, if used) may be directly viewed by an observer. Alternatively, this light may be received by frosted glass screen 41 to produce an image thereon.

The operation of the embodiment of this invention set forth in FIGURES 1 and 2 will now be described. A transparency containing images to be subjected to enhancement will be inserted in the apparatus. Rotating spots of light produced by light pipes 12 and 13 on rotating fly wheel 11 will appear at the output of converter 25 as two spots of light repetitively and simultaneously being swept in a linear path. These spots will be reflected by rotating apparatus 26 in a direction at right angles to this linear path. The spots of light as deflected by aparatus 26 will shine onto transparency 31 whereby this transparency will be illuminated.

Considering FIGURE 1 to be a plan view for purposes of illustration, the linear sweep of the light spots produced by converter 25 provides a linear sweep across the width of transparency 31. Rotating apparatus 26 produces a linear sweep across the height of the transparency 31. In a typical example of this embodiment, fly wheel 11 will rotate at 1,000 revolutions per second to cause a horizontal sweep rate of the light spot across the width of the transparency of 1,000 times per second. Apparatus 26 will be rotated at a speed which will produce a vertical sweep rate of the spots on the transparency of, for example, 60 times per second; apparatus 26 thus provides a linear sweep across the height of the film by changing in the vertical position that place where a given spot of light strikes the transparency. It will be seen that there has been provided on the transparency a raster-type scan of the light spots similiar to the raster scan of a conventional television system. In the scanning of the transparency the two light spots scan the transparency simultaneously and the monochromatic light spot will precede the white light spot by a period of time that is determined by the angular spacing on the fly wheel of light pipe ends 22 and 23 and by the velocity of rotation of the fly wheel. This period of time is selected for a purpose to be described below.

The intensity of the illumination from the light spots transmitted through transparency 31 depends upon the density of the image at that point scanned by the particular light spots. As explained above, the white light transmitted through the transparency will be substantially completely transmitted through selective reflecting device 32 whereby it can be viewed by an operator either with or without the aid of frosted glass screen 41. The monochromatic component of light will be reflected by device 32 onto photosensitive transducer 33 whereby there will be produced an electric signal representative of the image contained on the transparency.

In the processing of this signal by image enhancement circuit 34, a certain amount of time delay will be unavoidably introduced into the signal by circuit 34. This produces in the processed signal which will be supplied to one of the light intensity modulating means, examples of which described above, a time delay in the order of, for example, approximately 1 microsecond. Since the spot of light travels from fly wheel 11 through converter 25, apparatus 26, film 31, and means 32 to the eye of the observer at a velocity of approximately $300\times10^6$ meters per second, the total transit time for the light spot is in the order of a few nanoseconds. To compensate for this difference in time factor, the monochromatic light spot will be made to precede the white light spot in the raster scan applied to the transparency by a period of time that is set substantially equal to the time delay introduced by the image enhancement circuit 34, in the example stated, approximately 1 microsecond. By this expedient the instantaneous signal produced by transducer 33 in response to the striking of a certain point on the image by monochromatic light will give rise approximately 1 microsecond later in time to a white light spot of a certain intensity which will at that time be positioned on the transparency at exactly that same point whereat the monochromatic light spot gave rise to this signal.

Figure 3:
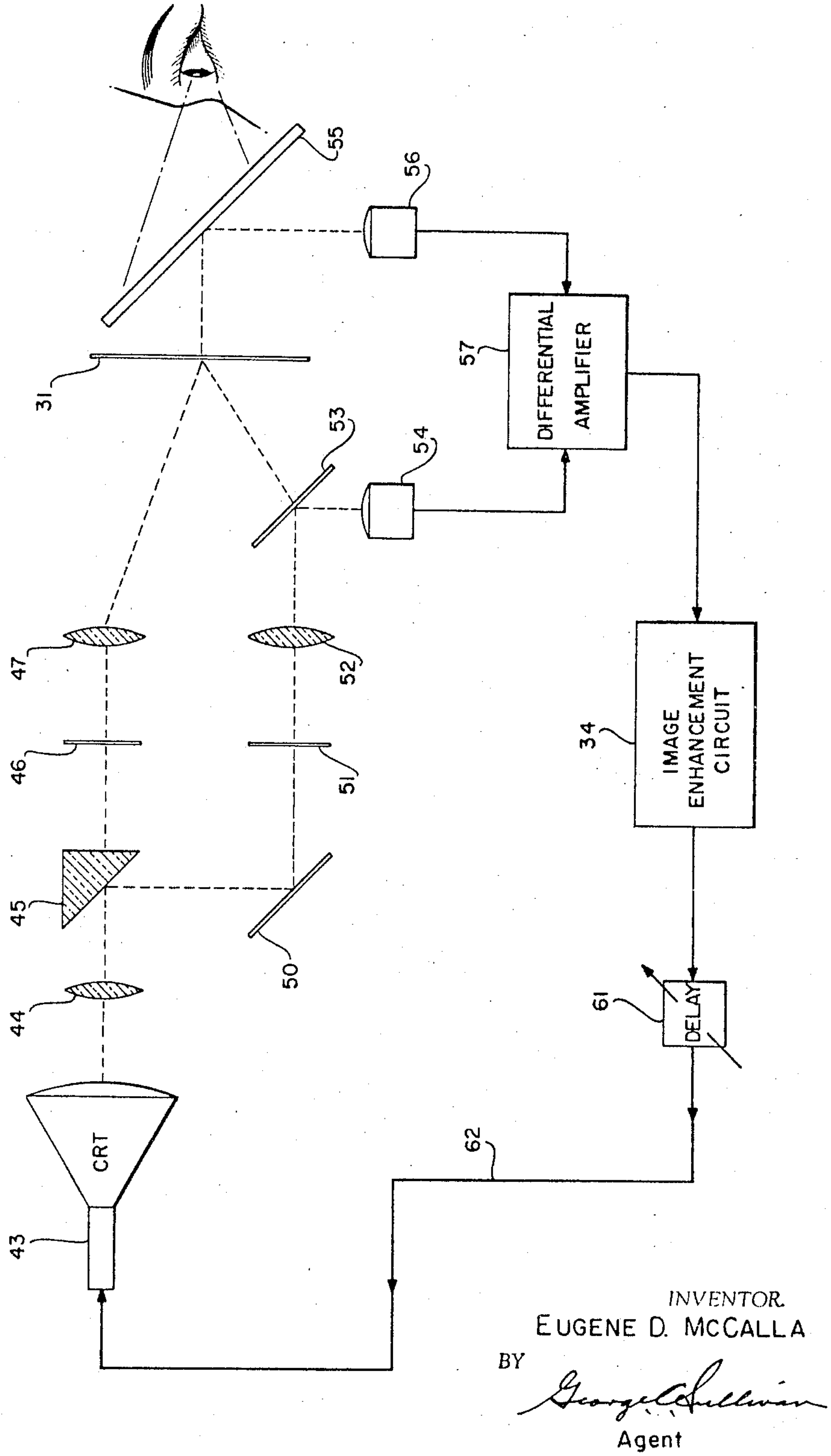
FIGURE 3 shows a schematic view of a second embodiment of this invention.

Turning now to FIGURE 3, another embodiment of this invention will be described in detail. Transparency 31 will be scanned by spots of light produced by a flying spot scanner which may conveniently take the form of a cathode ray tube (CRT) 43. This CRT is connected with suitable circuitry to produce a spot of light scanning across its surface; the scan may take any desired pattern and may, for example, be a conventional television raster. The light spot produced thereby will have a first component of light, which may be blue or ultraviolet, and a second component of light, which may be green. These two components of light may, by way of example, be produced by P15 phosphor which will yield a blue light having a persistence in the order of 0.05 microsecond and a green component of light having a persistence of a few milliseconds.

The dual component light spot produced by CRT 43 will be focused by lens 44 and directed to a surface of beam-splitting prism 45. Although beam splitting is shown as being accomplished by a prism, it should be understood that any suitable technique for producing two beams from the one input beam may be employed. A first output beam from prism 45 is reflected by mirror 50 through filter 51. Filter 51 permits the passage of a beam of light containing only the first light component to lens 52 wherein this beam is focused upon transparency 31. Interposed between lens 52 and the transparency is partial reflector 53 which transmits a majority, for example 95 percent, of the first beam containing the first component of light and reflects a minority, for example 5 percent, of this beam toward photosensitive transducer 54. The other beam from beam-splitting prism 45 will be passed through filter 46 which permits the passage of a beam containing only the second component of light. This beam will be focused by lens 47 onto transparency 31.

On the opposite side of the transparency there is disposed a selective reflecting device 55. This reflecting device permits the passage of substantially all of the second component of light while reflecting substantially all of the first component of light onto photosensitive transducer 56. Each of transducers 54 and 56 may be, by way of example, photo-multiplier tubes.

The outputs of each of the transducers 54 and 56 are received by differential amplifier 57. The output of differential amplifier 57, representing the instantaneous difference between the signals produced by each of the transducers, then is passed to image enhancement circuit 34. The input signal to the image enhancement circuit will be processed as explained earlier and the processed signal will be supplied through an optional delay line 61 back to cathode ray tube 43 as shown at 62 whereby the intensity of the illumination produced by the cathode ray tube is controlled by the output of the image enhancement circuit.

The basic operation of the embodiment of FIGURE 2 is similar to that of the FIGURE 1 embodiment in that a transparency containing an image to be subjected to image enhancement techniques is scanned in a predetermined pattern by two spots of light. The varying density of the image on the transparency will cause light of varying frequency and amplitude to be transmitted and this light will produce a signal to be processed by the image enhancement circuitry so that the intensity of the illumination source may be modulated thereby. In the scan pattern applied to transparency 31 there is a spot of light of the first component, which has been passed through filter 51 and focused by lens 52. Simultaneously following this first spot by a predetermined period of time there is a spot of light of the second component, passed through filter 46 and focused by lens 47. The first component of light as transmitted by the transparency will be reflected by device 55 onto transducer 56 whereby will be generated the electrical signal to be subjected to enhancement.

In modulating the light output of CRT 43 not only will the second component of light, or that component to be seen by the observer, be modulated but also the first component of light, or that used to provide the image enhancement signal, will be modulated. This is undesirable since it produces extraneous information on the signal to be enhanced and fed back to the CRT. This problem is overcome by reflecting a portion of the first component of light onto transducer 54. This portion produces a signal which represents the instantaneous intensity of the first light component and which is subtracted in differential amplifier 57 from the signal, produced by transducer 56, which represents the instantaneous value of the first light component as modified by the information contained on the transparency. The output of the amplifier 57 will thus contain only the modulation produced by the image on the transparency.

If optional delay line 61 is omitted, the period of time by which the light spot of the first light component precedes the light spot of the second light component in the scan pattern applied to the transparency will be made equal to the time delay introduced by the image enhancement circuit. By including an adjustable delay line 61 in series with the output from the image enhancement circuit 34, however, the delay in the image enhancement circuit may be adjusted to a standard value which will allow interchanging of equipment in production systems without the necessity of time-consuming readjustment of the lens system.

Although the embodiment of FIGURE 2 utilizes a CRT and the associated CRT deflection system, the problems of sync, linearity and jitter present in the usual closed circuit video system will be minimized with this embodiment. Unlike a closed circuit television system the direct viewing system of this embodiment does not require control of synchronization between the television camera and the monitor. Any deviation in linearity or sync of the deflections in the direct viewing system simply causes the light spots to move to a slightly different point on the picture. This movement does not produce distortion in the direct viewing system as it would in a closed circuit video system wherein the light spots would actually be creating the image rather than merely providing enhancement illumination for an image on a transparency.

The third embodiment of this invention shown in FIGURE 4 will now be described. This embodiment uses a flying spot scanner such as, for example, a CRT to cause the enhanced version of the image on the transparency to be reproduced on the face of the CRT. The flying spot scanner may conveniently take the form of a CRT 63 having a first component of light output and a second component of light output similar to the output of CRT 43. Suitable sweep circuits applied to the CRT will produce a spot of light moving in a desired scan pattern.

Positioned in front of CRT 63 and supported by suitable support means 64 and 65 is selective reflecting device 66. Device 66 functions to reflect substantially all of the second component of light and to transmit substantially all of the first component of light. The first component of light next passes to partial reflector 67 wherein the majority of the light is transmitted therethrough and a minority of the light is reflected to be received by a photosensitive means 71. For example, partial reflector 67 may transmit approximately 95 percent of the first component of light and may reflect approximately 5 percent of this component. The light transmitted through partial reflector 67 will be focused by lens 72 onto photographic transparency 73.

Transparency 73 will be scanned by a spot of light containing only the first component of light since the second component was removed by selective reflecting device 66. This spot of light will be modulated by the images contained on the transparency and will then be focused by lens 74 and received by photosensitive means 75. Each of photosensitive means 71 and 75 may, by way of example, be a photo-multiplier tube. The output signal from each of these means goes to differential amplifier 76. The output of this amplifier, which represents the difference between the two input signals thereto, then is supplied to image enhancement circuit 34. The output of this circuit is fed back to modulate the intensity of the light spot created by CRT 63.

In this embodiment the transparency will be scanned only by the first component which, in this example, contains either blue or ultraviolet light, and the signal produced by this scanning will be enhanced in image enhancement circuit 34 in the usual manner. Transducer 71 measures the instantaneous intensity of the first light component and this value is subtracted in differential amplifier 76 from the signal produced in transducer 75 whereby the input to the image enhancement circuit 34 contains only modulation produced by the image on the transparency. The intensity of light produced by CRT 63 is modulated by the processed signal from the image enhancement circuit so that the enhanced version of the image on the film actually is reproduced on the face of the CRT. This enhanced version may be viewed by the operator as it is shown on selective reflecting device 66, which functions to reflect substantially all of the second component of light.

Figure 4:
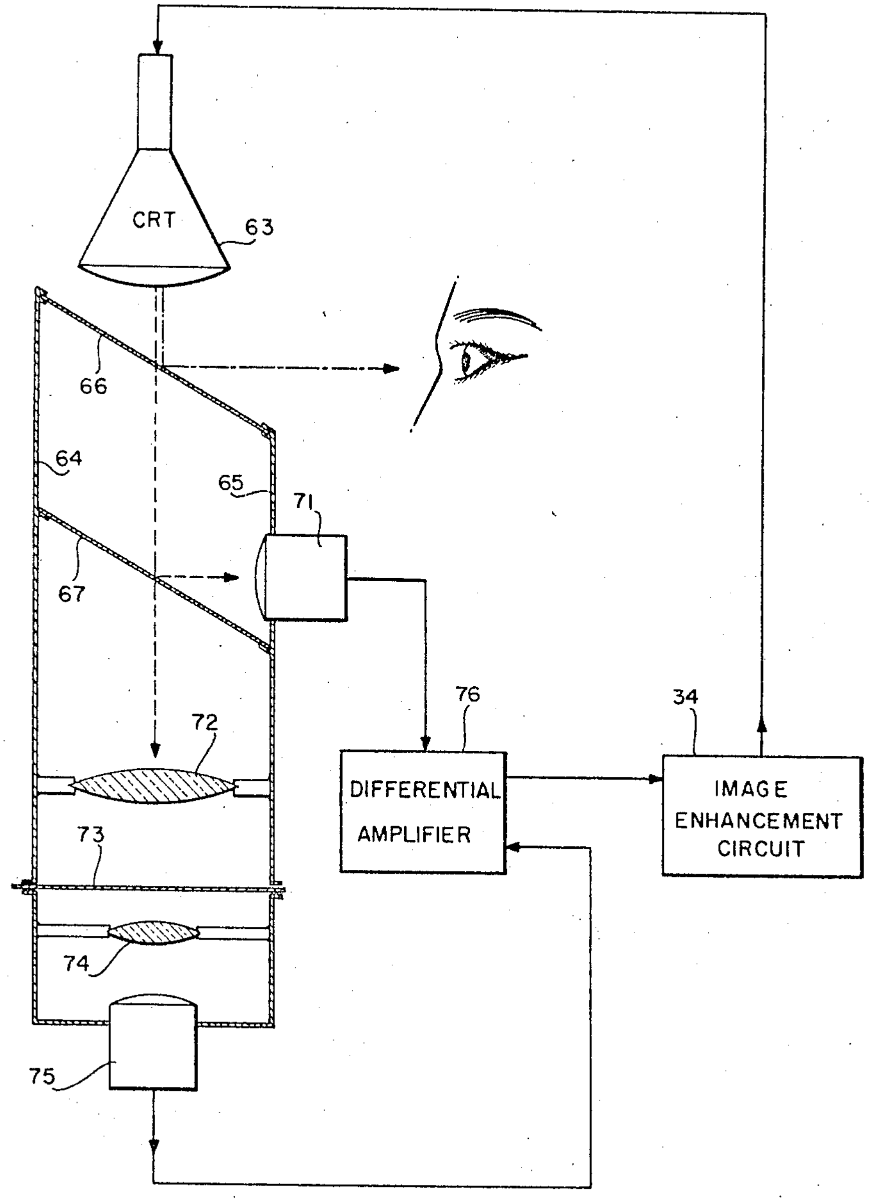
FIGURE 4 shows a schematic view of a third embodiment of this invention.

Since the embodiment of FIGURE 4 does away with the need for a beam-splitting prism and its associated optical system, this embodiment provides an image enhancement system of lower cost. Furthermore, since the embodiment of FIGURE 4 does not require a splitting of the output beam, the intensity of the first component of light as seen by the photosensitive means 75 will be greater and the signal upon which the image enhancement circuit can operate will be correspondingly greater.

From the foregoing it will be seen that there has been provided image enhancement method and apparatus which overcomes many of the problems of present image enhancement techniques. The absence of a video link having a television camera and monitor in addition to substantially reducing the cost of this apparatus does away with the usual problems of jitter, linearity and synchronization associated with high-resolution television systems. The problem associated with direct viewing enhancement systems caused by the inherent time delay of the enhancement circuitry has been solved by means of a dual-beam scan arrangement in two embodiments of the invention and by means of appropriate filters and reflecting means in a third embodiment. Although all of the illustrated embodiments of this invention require that a scan pattern be generated, this pattern is not used to recreate an image in a separate monitor which must be precisely synchronized with the scanning means; the presence of nonlinearity in the method and apparatus of this invention, while it is to be avoided, will only result in illumination of another portion of the image rather than distortion or substantial destruction of the image. It should be noted here that although the invention has been described using a conventional television raster scan, any desired pattern of scan may be used with this invention so long as the two beams of light are made to follow one another in chosen scan pattern by a predetermined time.

It should be understood, of course, that the foregoing disclosure relates only to preferred embodiments of the invention and that numerous modifications or alterations may be made therein without departing from the spirit and the scope of the invention as set forth in the appended claims.

What is claimed is:

1. The method of compensating for the time delay of image signal processing circuitry used to provide enhancement of an image carried by a photographic film, comprising the steps of:
- scanning the film in a predetermined pattern with a first beam of radiation;
- simultaneously scanning the film along said predetermined pattern with a second beam of radiation which lags said first beam by a predetermined time equal to said time delay;
- varying the intensity of said second beam as a function of the extent which the film permits passage of said first beam; and
- viewing the film as scanned by said second beam of radiation.

2. The method of enhancing an image contained on photographic film, comprising the steps of:
- scanning the film in a predetermined pattern with a first source of radiation;
- simultaneously scanning the film in the same predetermined pattern with a second source of radiation, said scanning by said second source of radiation following said scanning by said first source of radiation in a said scan pattern by a fixed period of time;
- measuring the intensity of the radiation from said first source passed through the film to obtain a signal representative thereof;
- processing said signal with circuitry which introduces an unavoidable time delay in its functioning; and
- modulating the intensity of said second source of radiation with the processed signal, said fixed period of time being substantially the same as said time delay.

3. The method of compensating for the time delay of image signal processing circuitry used to provide enhancement of an image carried by a photographic film, comprising the steps of:
- scanning the film in a predetermined pattern with a beam of invisible radiation;
- measuring the intensity of said radiation passing through the film to obtain a signal representative of the image thereon;
- passing said signal to the input of signal processing circuitry which introduces an unavoidable time delay before the processed signal appears at the output of the circuitry;
- scanning said film in said predetermined pattern with a beam of visible radiation simultaneously with said first-mentioned step of scanning, said beam of visible radiation being delayed in the scan pattern with respect to the beam of invisible radiation by a period of time equal to said time delay; and
- causing the intensity of said beam of visible radiation to be modulated in accordance with the processed signal from said signal processing circuitry.

4. Apparatus for scanning an image contained on a photographic film comprising:
- means for supporting a photographic film to be scanned;
- scan generating means simultaneously producing a first spot of radiation and a second spot of radiation, each of said spots moving in a common predetermined path to scan at least a portion of a film in said film supporting means, said first spot preceding said second spot in said path by a fixed period of time, at least said second spot including radiation in the visible spectrum;
- transducer means positioned to receive radiation passed through the film from said first spot of radiation, said transducer means producing an output signal in response to the intensity of the radiation received thereby; and
- circuit means receiving the output signal from said transducer means and producing therefrom an output signal that is a function of said transducer output signal and is delayed in time with respect to said transducer output signal;
- the output of said circuit means being fed back to said scan generating means to modulate the intensity of at least said second spot of radiation;
- said fixed period of time by which said first spot precedes said second spot being made equal to said time delay introduced by said circuit means.

5. Apparatus as in claim 4, further comprising:
- selective reflecting means fixedly positioned to receive radiation passed through the film from said spots of radiation, said selective reflecting means reflecting substantially all of the radiation from said first spot and transmitting substantially all of the radiation from said second spot;
- said transducer means being positioned to receive said reflected radiation.

6. Apparatus as in claim 4 wherein said scan generating means comprises:
- a rotating means for generating a circular scan path in which said first spot and said second spot move;
- converter means for receiving said circular scan path and producing therefrom a linear scan path which said spots cyclically traverse; and
- reflective means receiving said linear scan path and causing reflection of said spots in a direction substantially transverse to said linear scan path.

7. Apparatus as in claim 4 wherein said scan generating means comprises:
- a flying spot scanning means connected to produce a spot of radiation having a first component and a second component and moving in a predetermined scan path; and
- optical means receiving said spot produced by the flying spot scanning means and separating this spot into said first and second components;
- said optical means functioning further to focus said first and second components to form said first and second spots on a film supported for scanning.

8. An image enhancement system comprising:
- means for supporting a photographic image to be scanned;
- means producing a first spot of invisible radiation scanning said image in a predetermined pattern;
- means producing a second spot of visible radiation simultaneously scanning said image in the same pattern, said first spot preceding said second spot in the scan pattern by a fixed amount of time;

transducer means producing a signal in response to the intensity of radiation transmitted through the photographic image;

circuit means receiving the signal from said transducer means and producing an output signal which is a function of said received signal, said circuit means imparting a time delay to signals received thereby; and means responsive to the output signal of said circuit means to vary the intensity of said visible radiation passed through said photographic image;

said fixed amount of time being chosen to compensate for time delay of said circuit means.

9. Apparatus for scanning an image contained on a photographic film comprising:

a rotating member containing first and second light pipes, said first light pipe having one end exposed to a source of substantially monochromatic illumination and said second light having an end exposed to a source of substantially white light, the other ends of each of said light pipes being mounted on a circircumference of a face of the rotating member, said other ends being separated on said circumference by a certain distance, said rotating member being rotated at a predetermined velocity so that the said other end of the light pipe exposed to said source of monochromatic illumination leads the said other end of the light pipe exposed to said source of substantially white light to produce movement in a circular scan path of first a monochromatic light spot and then a white light spot;

optical converter means positioned to receive said rotating light spots, said optical converter means functioning to convert said circular scan path to a cyclically linear scan wherein a monochromatic light spot precedes a white light spot along a predetermined uniplanar path;

a rotating reflective means positioned to accept said linear scan, said rotating reflective means producing optical angular deflection of said light spots in a direction substantially transverse to said uniplanar path, whereby there is produced a scan pattern of said light spots in which said monochromatic spot precedes said white spot by a certain period of time;

means for supporting a film to be scanned by said scan pattern;

selective reflecting means positioned to receive illumination passed through said film, said reflecting means reflecting substantially all of the monochromatic light passed through said film and transmitting substantially all of the white light passed through the film;

photosensitive transducer means positioned to receive the monochromatic light reflected by said reflecting means, said transducer means producing a signal that is a function of said reflected light;

circuit means receiving said signal and operating thereon to produce an output signal that is a function of said signal, said circuit means imparting a time delay to signals on which it operates; and means responsive to said output signal to modulate the instantaneous intensity of the light transmitted through said selective reflecting means as seen by an observer thereof;

said certain period of time by which said monochromatic spot precedes said white spot in the scan pattern being made equal to said time delay imparted by said circuit means.

10. Apparatus as in claim 9 wherein the last-named means comprises means for controlling the intensity of said source of substantially white light.

11. Apparatus as in claim 9 wherein the last-named means comprises light-modulating means positioned to receive the light transmitted through said selective reflecting means.

12. Apparatus for scanning an image contained on a photographic film comprising:

a cathode ray tube having illumination output including a first component of light output and a second component of light output, at least one of said components including light visible to an observer;

beam splitting means receiving said illumination output and producing therefrom two beams of illumination, each of said two beams including both of said components of light;

a first filter positioned to receive one of said beams of illumination and permitting substantial passage only of said first component of light;

a second filter positioned to receive the other of said beams of illumination and permitting substantial passage only of said second component;

a first lens means positioned to receive light passed through said first filter;

a second lens means positioned to receive light passed through said second filter;

means for supporting a photographic film so that said film is scanned by the beam of light from each of said lens means;

said lens means being aligned so that the beam from said first lens means precedes by a predetermined period of time in the scan of a film the beam from said second lens means;

partial reflection means interposed in the light path between said first lens means and said film support means, said partial reflection means transmitting a substantial portion of said first component of light and reflecting a minor portion of said first component of light output;

first photosensitive means positioned to receive said reflected minor portion and producing a first output signal in response thereto;

selective reflecting means positioned to receive illumination passed through a film from said scan, said reflecting means reflecting substantially all of said first component of light and transmitting substantially all of said second component of light;

second photosensitive means positioned to receive said first component of light reflected by said selective reflecting means and producing a second output signal in response thereto;

differential amplifier means receiving the signals produced by said first and second photosensitive means, the output of said differential amplifier means being a signal representative of the difference between said first and said second transducer output signals; and circuit means receiving as an input the output of said differential amplifier and operating thereon to produce and output that is a function of its input, said circuit imparting a time delay to signals on which it operates, the output of said circuit means being applied to control the intensity of illumination of said cathode ray tube;

said predetermined period of time by which the beam from said second lens precedes the beam from said first lens being chosen to compensate for the time delay imparted by said circuit means.

13. Apparatus for scanning an image carried on a photographic film comprising:

a flying spot scanning means producing a spot of radiation having a first component and a second component, at least said second component including visible radiation;

means for holding a film to be scanned so that the film will be exposed to the spot of radiation from said scanning means;

means interposed between said scanning means and said holding means for diverting said second component of radiation away from a normal path of travel between said scanning means and said holding means;

transducer means positioned to receive radiation passed through said film, and to produce a signal in response thereto;

circuit means responsive to said transducer signal to produce a signal that is a function of said transducer signal and is delayed in time with respect to said transducer signal;

feedback means modulating the intensity of said spot of radiation in response to said signal produced by said circuit means, partial reflection means interposed between said scanning means and said holding means for reflecting a minority of said first component of radiation and transmitting a majority of said first component of radiation;

second transducer means positioned to receive said reflected minority of said first component and to produce a signal in response thereto; and differential amplifier means receiving the signals produced by each of said transducer means and producing an output signal that represents the instantaneous difference between the intensity of radiation received by said transducer means, said output signal of the differential amplifier being an input signal to said circuit means.

References Cited

UNITED STATES PATENTS

| | | | |
|---|---|---|---|
| 2,480,423 | 8/1949 | Simmon | 178—6.8 |
| 2,989,909 | 6/1961 | Reed | 178—6.8 |
| 3,227,059 | 1/1966 | Craig | 95—73 |
| 3,249,691 | 5/1966 | Bigelow | 178—6.8 |
| 3,251,936 | 5/1966 | Berchtold | 178—6.8 |
| 3,270,611 | 9/1966 | Gelernter | 88—1 |
| 3,271,515 | 7/1966 | Harper | 178—6.8 |

ROBERT L. GRIFFIN, *Primary Examiner.*

JOHN W. CALDWELL, *Examiner.*

J. A. ORSINO, *Assistant Examiner.*